United States Patent
Patil et al.

(10) Patent No.: US 10,013,426 B2
(45) Date of Patent: Jul. 3, 2018

(54) DEDUPLICATING SIMILAR IMAGE OBJECTS IN A DOCUMENT

(75) Inventors: Sandeep R. Patil, Pune (IN); Sri Ramanathan, Lutz, FL (US); Riyazahamad M. Shiraguppi, Pune (IN); Prashant Sodhiya, Pune (IN); Matthew B. Trevathan, Kennesaw, GA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 733 days.

(21) Appl. No.: 13/523,041

(22) Filed: Jun. 14, 2012

(65) Prior Publication Data

US 2013/0339848 A1 Dec. 19, 2013

(51) Int. Cl.
*G06F 17/30* (2006.01)
*G06F 17/00* (2006.01)

(52) U.S. Cl.
CPC .............. *G06F 17/30156* (2013.01)

(58) Field of Classification Search
CPC . G06F 7/08; G06F 17/00; G06F 17/30; G06F 7/00; G06F 17/30156; G06K 9/48; G06K 9/62; G06K 9/46
USPC .................. 715/255, 755, 530, 534
See application file for complete search history.

(56) References Cited

U.S. PATENT DOCUMENTS

| 7,017,113 | B2 * | 3/2006 | Bourbakis et al. | ........... 715/256 |
| 7,460,735 | B1 | 12/2008 | Rowley et al. | |
| 7,493,312 | B2 * | 2/2009 | Liu et al. | |
| 7,593,932 | B2 * | 9/2009 | Lindh | ............ G06F 17/30607 |
| 7,801,893 | B2 * | 9/2010 | Gulli' et al. | ................. 707/737 |
| 8,356,035 | B1 * | 1/2013 | Baluja et al. | ................. 707/741 |
| 8,429,163 | B1 * | 4/2013 | Ahmadullin | ...... G06F 17/30011 382/305 |
| 2007/0078846 | A1 * | 4/2007 | Gulli | ................. G06F 17/30247 |
| 2007/0265870 | A1 * | 11/2007 | Song | ..................... G06Q 30/00 705/7.29 |
| 2008/0097941 | A1 * | 4/2008 | Agarwal | ............. G06N 99/005 706/12 |
| 2008/0133526 | A1 * | 6/2008 | Haitani et al. | .................... 707/7 |

(Continued)

FOREIGN PATENT DOCUMENTS

JP    2011138512 A    7/2011

OTHER PUBLICATIONS

Tsai, S. et al., "Content-Based Image Retrieval With Ontological Ranking", Proceedings of SPIE—The International Society for Optical Engineering, vol. 7540, Feb. 2010, 8 pages.

(Continued)

*Primary Examiner* — Cesar Paula
*Assistant Examiner* — Jian Huang
(74) *Attorney, Agent, or Firm* — Christopher McLane; Andrew M. Calderon; Roberts Mlotkowski Safran Cole & Calderon, P.C.

(57) ABSTRACT

Systems and methods for image deduplication in a file are provided. A method includes identifying a plurality of similar images (e.g., similar intent images) in an electronic document. The method also includes designating one of the plurality of similar images as a master copy. The method also includes replacing each remaining one of the plurality of similar images, other than the master copy, with one of (i) a duplicate copy of the master copy and (ii) a soft link pointing to the master copy.

16 Claims, 8 Drawing Sheets

(56) References Cited

U.S. PATENT DOCUMENTS

| | | | |
|---|---|---|---|
| 2009/0303160 A1 | 12/2009 | Chew et al. | |
| 2009/0319570 A1 | 12/2009 | Subramanian | |
| 2010/0253967 A1* | 10/2010 | Privault | G06K 9/6256 358/1.15 |
| 2011/0085728 A1 | 4/2011 | Gao et al. | |
| 2011/0085739 A1* | 4/2011 | Zhang et al. | 382/218 |
| 2011/0103684 A1* | 5/2011 | Bhatt | G06T 9/00 382/166 |
| 2011/0103699 A1* | 5/2011 | Ke | G06F 17/30265 382/209 |
| 2011/0106782 A1 | 5/2011 | Ke et al. | |
| 2011/0153653 A1 | 6/2011 | King et al. | |
| 2011/0176737 A1* | 7/2011 | Mass | G06F 17/30265 382/220 |
| 2012/0315925 A1* | 12/2012 | Ioppe | H04W 4/02 455/456.3 |

OTHER PUBLICATIONS

Gao, B. et al., "Web Image Clustering by Consistent Utilization of Visual Features and Surrounding Texts", Proceedings of the 13th annual ACM international conference on Multimedia, Nov. 6-11, 2005, pp. 112-121.

Cascia, M. et al., "Combining Textual and Visual Cues for Content-based Image Retrieval on the World Wide Web", IEEE Workshop on Content-Based Access of Image and Video Libraries, 1998, 5 pages.

http://www.duplicatephotofinder.com/features.php, Duplicate Photo Finder Software for Windows, DuplicatePhotoFinder.com, 2012, 4 pages.

Szabo, P., "Optimizing PDF output size of TEX documents", http://www.tug.org/TUGboat/tb30-3/tb96szabo.pdf, Maps 39, Jun. 12, 2012, pp. E112-E130.

Mell, P., "The NIST Definition of Cloud Computing", National Institute of Standards of Technology, Information Technology Laboratory, Ver 15, Oct. 7, 2009, pp. 1-2.

* cited by examiner

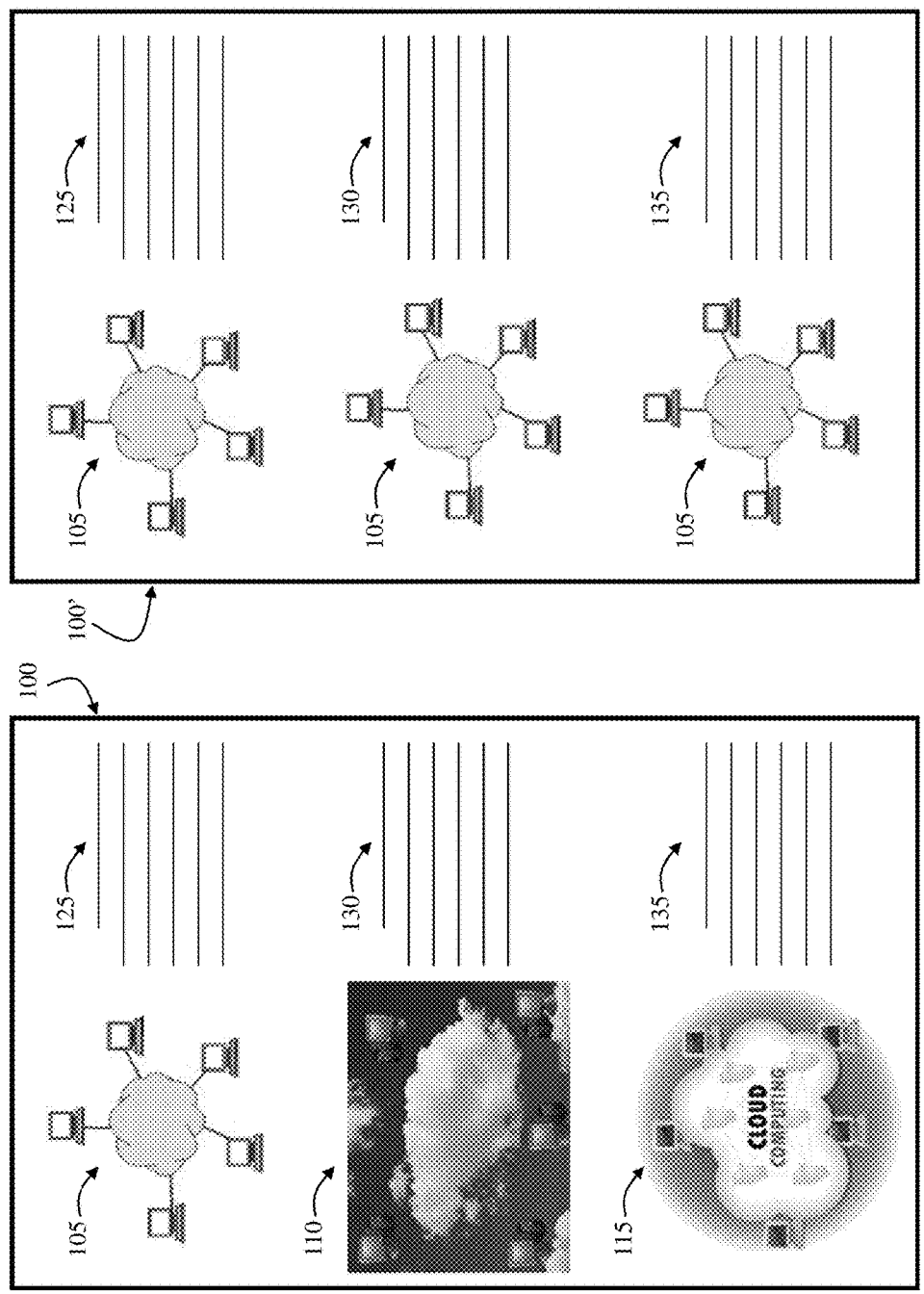

Threshold Value = 50
Similar Images = Image1 and Image4

Threshold Value = 20
Similar Images = Image1, Image2, and Image4

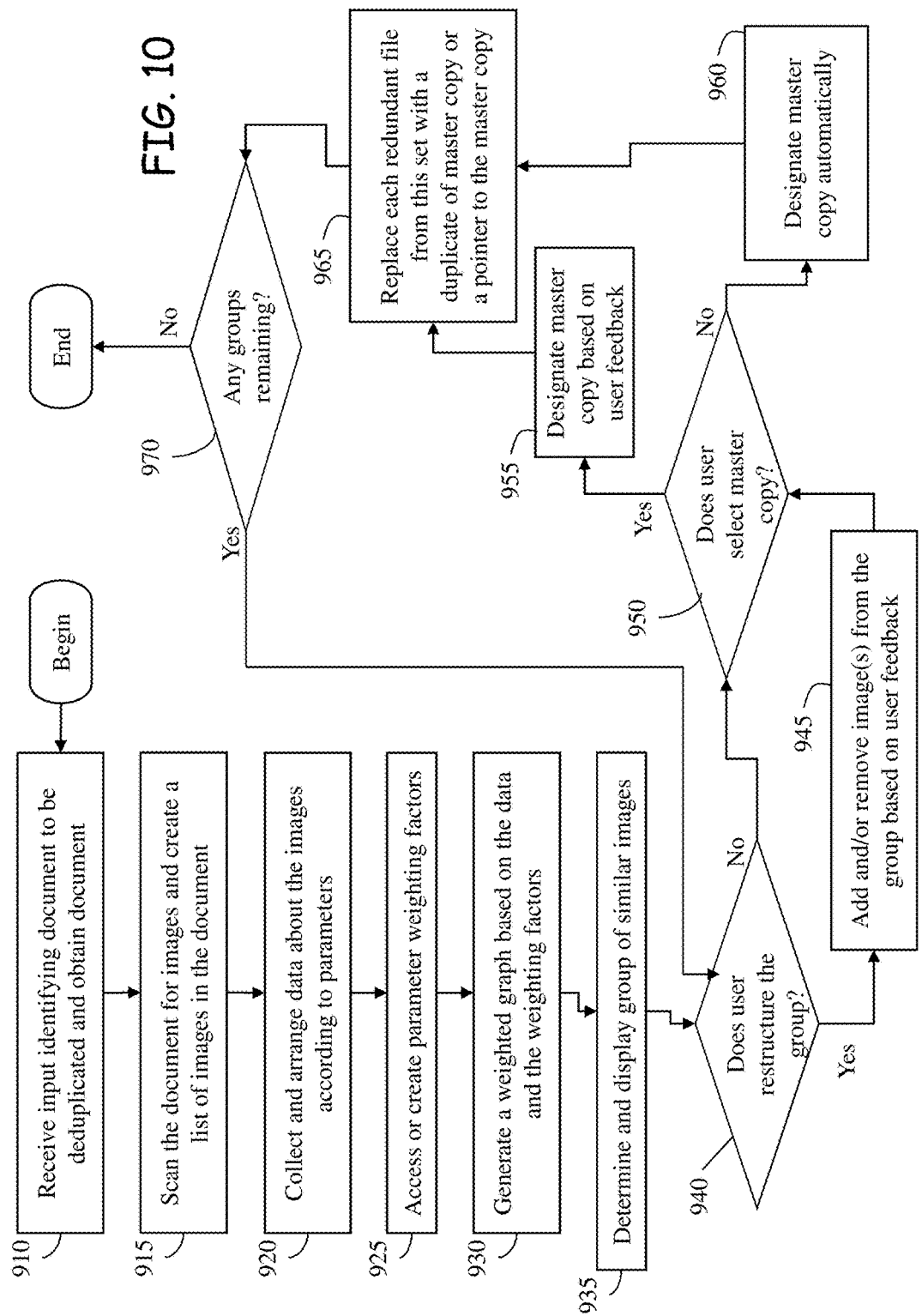

DEDUPLICATING SIMILAR IMAGE OBJECTS IN A DOCUMENT

TECHNICAL FIELD

The present invention generally relates to data deduplication and, more particularly, to methods and systems for deduplicating similar image objects in a document.

BACKGROUND

Data deduplication comprises a process to eliminate redundant data. In the deduplication process, duplicate data is deleted leaving only one copy of the data to be stored. Deduplication is able to reduce the effective storage capacity because only unique data is stored. Data deduplication can generally operate at the file or the data block level. File level deduplication eliminates duplicate files. Block deduplication looks within a file and saves unique iterations of each block or bit. Data deduplication is particularly pertinent to storage clouds in which massive quantities of data are stored, since reducing redundant data can reduce the costs of operating a storage cloud.

Information technology is changing rapidly and now forms an invisible layer that increasingly touches nearly every aspect of business and social life. An emerging computer model known as cloud computing addresses the explosive growth of Internet-connected devices, and complements the increasing presence of technology in today's world. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

Cloud computing is massively scalable, provides a superior user experience, and is characterized by new, Internet-driven economics. In one perspective, cloud computing involves storage and execution of business data inside a cloud which is a mesh of interconnected data centers, computing units and storage systems spread across geographies.

Collaborative writing refers to projects where written works are created by multiple people together, e.g., collaboratively, rather than individually. As the scope of a document expands, it becomes difficult for a single author to write all the content. This might be due to limitations in technical expertise and/or time constraints. Collaborative writing can overcome such limitations by providing a group effort that creates a more unified document.

As a part of collaborative writing, multiple authors come together as a group to write a document. The group may identify the main aspects of the issue they wish to address and discuss strategies for approaching each aspect of the issue. Each member of the group may then choose or be assigned an aspect of the issue to address. Collaborative writing is amenable to cloud computing since a single version of a document can be stored in a cloud environment and edited by plural different members of the group, e.g., from different local computing devices.

Collaborative writing tools facilitate the editing and reviewing of a text document by multiple individuals. These tools typically focus on formatting and editing facilities of a word processor with the addition to live chat, live markup and annotation, co-editing, version tracking, change merging, etc. However, these tools lack intelligence for consideration of duplicate content of the document and identifying/purging duplicate content. There is a high possibility that the same or similar content might exist across sections of a document edited by different authors. The content can be in the form of textual data, tables, and diagrams in the form of image file/clip-art objects.

A document authored by a single author may also have redundant content. For example, a single author writing a document over a period of time might end up using different images to depict a same intent in different sections of the same document.

SUMMARY

In a first aspect of the invention, there is a method implemented in a computer infrastructure comprising a combination of hardware and software. The method includes identifying a plurality of similar images in an electronic document. The method also includes designating one of the plurality of similar images as a master copy. The method also includes replacing each remaining one of the plurality of similar images, other than the master copy, with one of (i) a duplicate copy of the master copy and (ii) a soft link pointing to the master copy.

In another aspect of the invention, a system is implemented in hardware and includes a computer infrastructure operable to: scan a document to collect data associated with a plurality of images in the document; determine a group of similar images from the plurality of images based on the data; designate one image of the group as a master copy; and replace each remaining image of the group, other than the master copy, with one of (i) a duplicate copy of the master copy and (ii) a soft link pointing to the master copy.

In an additional aspect of the invention, a computer program product includes a computer usable storage medium having readable program code embodied in the storage medium, the computer program product includes at least one component operable to: scan a document to collect data associated with a plurality of images in the document; arrange the data according to a plurality of parameters; obtain a plurality of weighting factors corresponding to the plurality of parameters, respectively; determine a group of similar images from the plurality of images based on the data and the plurality of weighting factors; designate one image of the group as a master copy; modify the document by replacing each remaining image of the group, other than the master copy, with one of (i) a duplicate copy of the master copy and (ii) a soft link in the document pointing to the master copy; and save the modified document.

In a further aspect of the invention, a method of deduplication includes providing a computer infrastructure being operable to: scan a document to collect data associated with a plurality of images in the document; determine a group of similar images from the plurality of images based on the data and a plurality of weighting factors associated with the data; designate one image of the group as a master copy; and modify the document by replacing each remaining image of the group, other than the master copy, with one of (i) a duplicate copy of the master copy and (ii) a soft link in the document pointing to the master copy.

In another aspect of the invention, a computer system for file deduplication includes a CPU, a computer readable memory and a computer readable storage media. The system includes first program instructions to scan an electronic document to collect data associated with a plurality of images in the document. The system includes second program instructions to determine a group of similar images from the plurality of images based on the data. The system includes third program instructions to designate one image of the group as a master copy. The system includes fourth program instructions to modify the document by replacing each remaining image of the group, other than the master copy, with one of (i) a duplicate copy of the master copy and (ii) a soft link in the document pointing to the master copy. The first, second, third, and fourth program instructions are stored on the computer readable storage media for execution by the CPU via the computer readable memory.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

FIGS. 4 and 5 illustrate similar-image deduplication in accordance with aspects of the invention;

FIG. 10 depicts an exemplary flow diagram in accordance with aspects of the invention.

DETAILED DESCRIPTION

Figure 1:
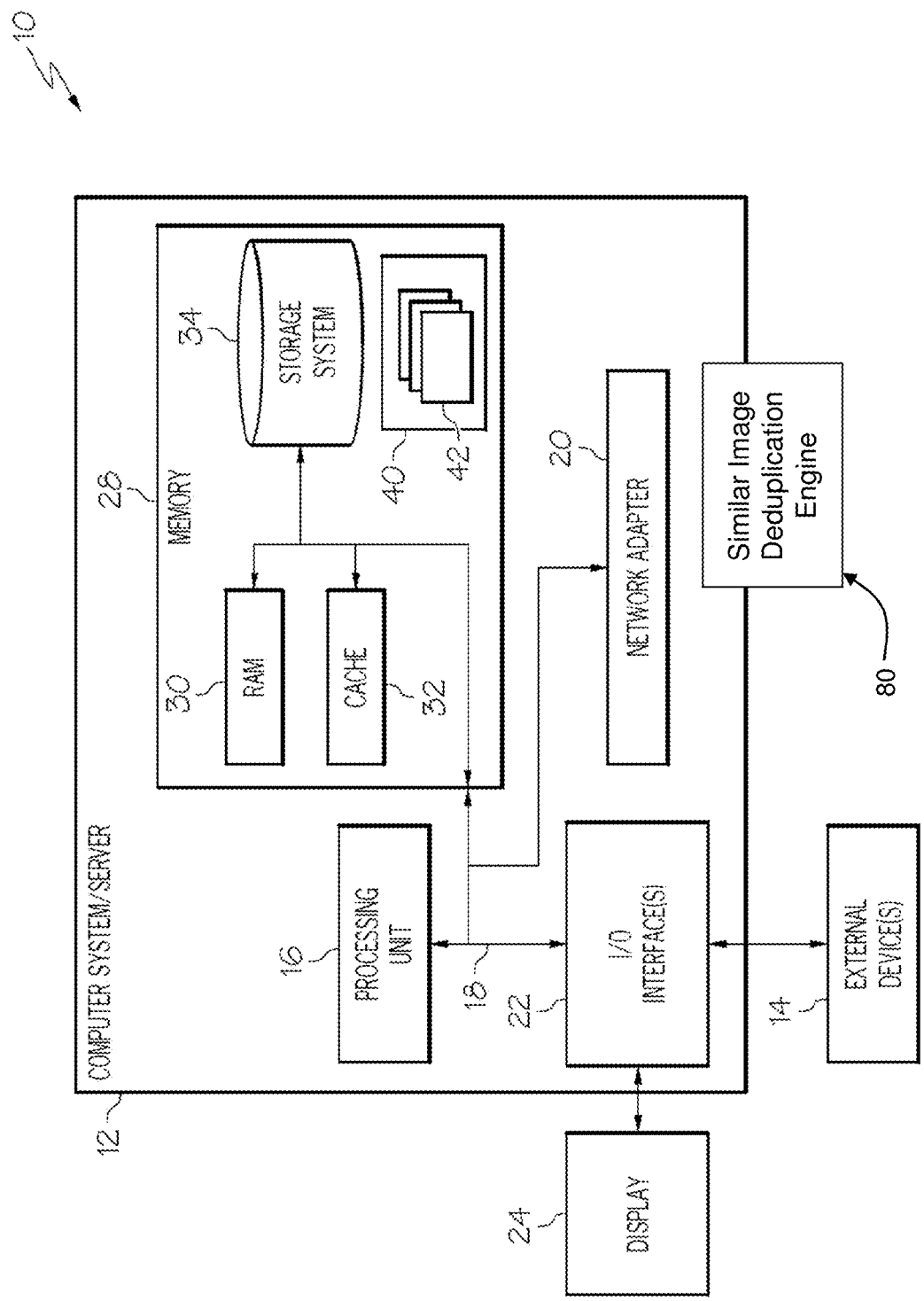
FIG. 1 depicts a cloud computing node according to an embodiment of the present invention.

The present invention generally relates to data deduplication and, more particularly, to methods and systems for deduplicating similar image objects in a document. In accordance with aspects of the invention, a document having plural similar images (e.g., plural different images with similar intent) is modified to show a same image in the place of each of the plural similar images. In embodiments, systems and methods identify a group of similar images with common intent in a document, e.g., by reading metadata, image title, section heading, and/or other parameters associated with various images in the document. A master copy of the group of similar images is determined either automatically or with user feedback. All the images in the group are replaced in the document with a single image, e.g., the visual appearance of the master copy. In embodiments, all of the similar images in the group are replaced with a duplicate copy of the master copy. Alternatively, the single image is stored in the document only once and soft links are used to point to the master copy, instead of storing duplicate copies at every location of recurrence. In this manner, implementations of the invention advantageously provide methods and systems for reducing file size (e.g., storage size) by deduplicating similar images in a document.

Implementations may include a utility (e.g., a similar-image deduplication engine described in greater detail below) that is run by a user (e.g., a master author) in a collaborative writing scenario in which plural authors contribute to a single document. Embodiments may be implemented in a cloud environment where a single copy of the document is stored in a cloud and the plural authors edit the document via different local computing devices. The utility may be run by the user at any desired stage of document preparation, e.g., at a final stage of document preparation. The utility may include programming that provides a visual interface which assists the user in identifying similar images in the document so that the user can choose which image to keep as a master copy and which image(s) to replace with the master copy. For example, the utility may be programmed to assign respective weights to each of the similar images, present the weights to the user, and receive an indication of the master copy from the user. In embodiments, deleted images are replaced with a soft link (e.g., reference pointer) that points to the master image so that the same image can be displayed at plural locations in the document while only saving a single copy of the image, thus reducing the stored file size.

Cloud Computing

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

For convenience, the Detailed Description includes the following definitions which have been derived from the "Draft NIST Working Definition of Cloud Computing" by Peter Mell and Tim Grance, dated Oct. 7, 2009, which is cited in an IDS filed herewith, and a copy of which is attached thereto.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. FIG. 1 can also represent a computing infrastructure capable of performing and/or implementing tasks and/or functions of the methods described herein.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16. In embodiments, the computer system/server 12 comprises or communicates with a similar-image deduplication engine 80 as described in greater detail herein.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein. For example, some or all of the functions of the similar-image deduplication engine 80 may be implemented as one or more of the program modules 42. Additionally, the similar-image deduplication engine 80 may be implemented as separate dedicated processors or a single or several processors to provide the functionality described herein. In embodiments, the similar-image deduplication engine 80 performs one or more of the processes described herein, including but not limited to: identifying similar images in a document; designating a single master image from the group of similar images; and replacing each remaining similar image, other than the master image, with one of (i) a duplicate copy of the master image and (ii) a soft link (e.g., reference pointer) to the master image.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID (redundant array of inexpensive disks or redundant array of independent disks) systems, tape drives, and data archival storage systems, etc.

Figure 2:
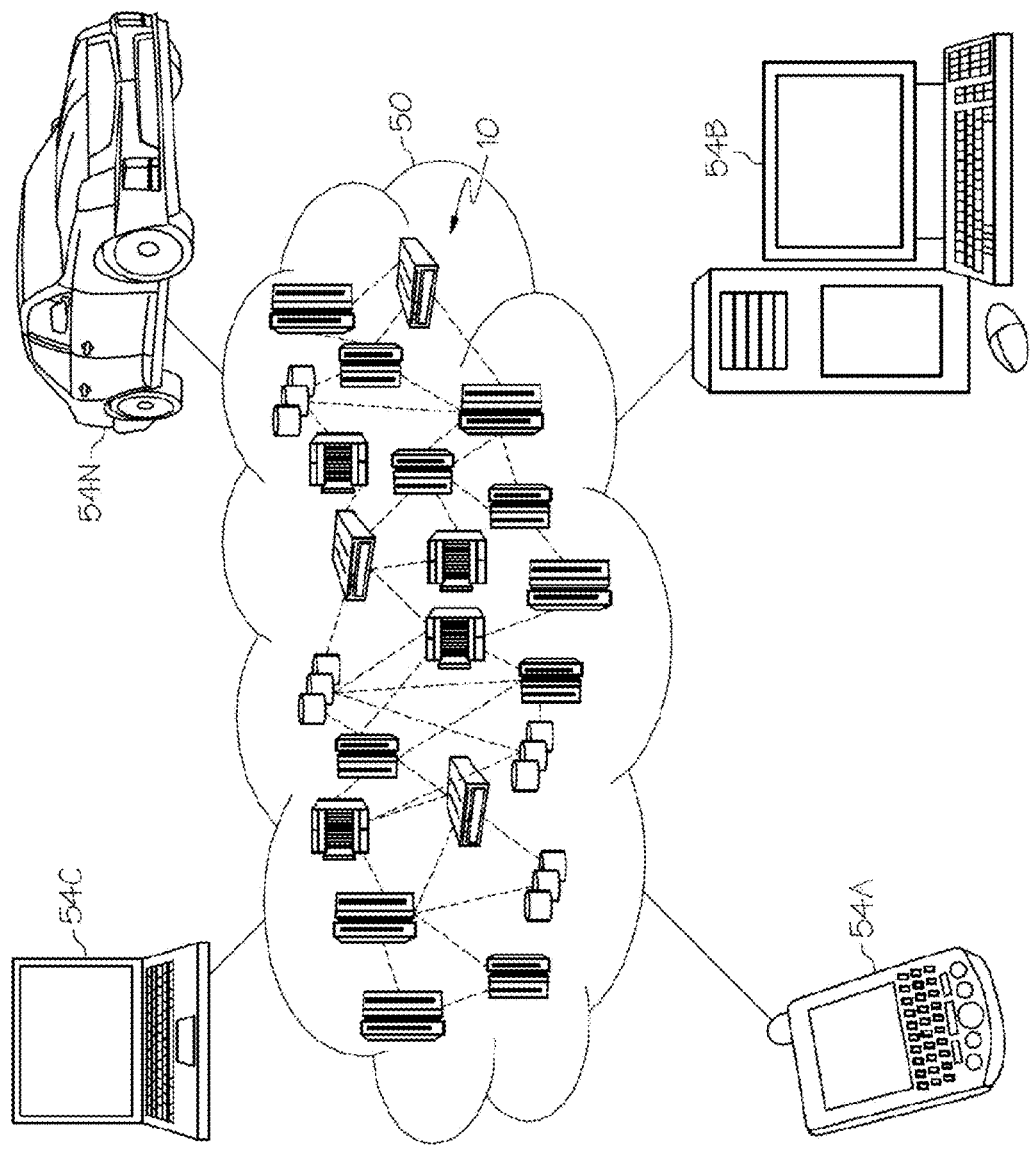
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
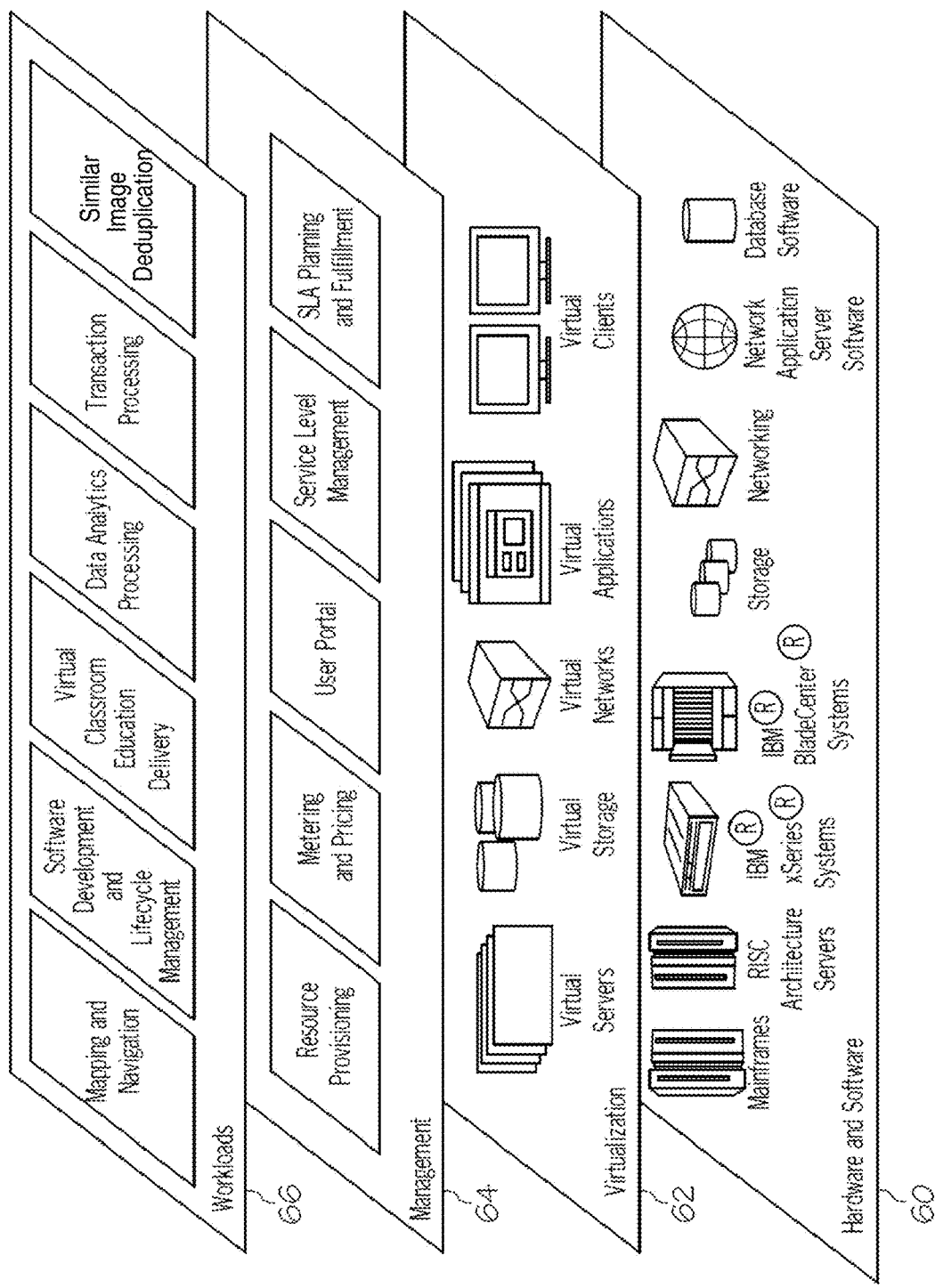
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and similar-image deduplication. In accordance with aspects of the invention, the similar-image deduplication workload/function operates to perform one or more of the processes described herein, including but not limited to: identifying similar images in a document; designating a single master image from the group of similar images; and replacing each remaining similar image, other than the master image, with one of (i) a duplicate copy of the master image and (ii) a soft link (e.g., reference pointer) to the master image.

As will be appreciated by one skilled in the art, aspects of the present invention, including the similar-image deduplication engine 80 and the functionality provided therein, may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Similar-Image Deduplication

Tools that perform deduplication at the document level operate by identifying duplicate content (e.g., exactly matching textual and/or image content) in a document and applying application level deduplication to maintain only a single copy of any such duplicate content in the document. For example, a word processor may include a mechanism to detect a same image that is included multiple times in a document, and store only a single copy of the image with other instances keeping a reference pointer to the single stored copy. However, simply identifying and deduplicating exactly matching content (e.g., plural instances of a same image in a document) is ineffective for identifying and deduplicating similar, but not exactly matching, content (e.g., plural instances of similar images having a same intent in a document).

FIGS. 4 and 5 illustrate similar-image deduplication in accordance with aspects of the invention. FIG. 4 shows a document 100 including images 105, 110, 115. The document 100 may also have text 125, 130, 135 associated with the images 105, 110, 115, respectively. The document 100 may be any suitable type of electronic document, such as a document created using an electronic word processor application running on a computing device. The images 105, 110, 115 may be any suitable image objects having any suitable format, including but not limited to ".jpg", ".gif", ".bmp", ".tif", ".png", etc. The images 105, 110, 115 may have different formats, one or more of the images may have a same format.

As depicted in FIG. 4, the images 105, 110, 115 are not identical to one another, e.g., are not duplicates of one another. For example, image 105 does not exactly match image 110 or image 115. The images 105, 110, 115 are similar to one another, however, in the sense that each of the images 105, 110, 115 depicts cloud computing. As used herein, the phrase 'similar images' refers to images with similar intent, e.g., plural different images with similar intent. Such a case may arise, for example, when document 100 is a collaborative writing document in which three different authors working independently provide the images 105, 110, 115 and associated text 125, 130, 135. As an example, the document may be a technical writing on cloud computing, and a first author may provide image 105 and text 125 for describing an overview of cloud computing technology. Likewise, a second author may provide image 110 and text 130 in describing cloud layers and deployment models, and a third author may provide image 115 and text 135 in describing cloud engineering and storage issues.

Since each image 105, 110, 115 is different, a deduplication process that operates based on exactly matching data cannot nominate the images 105, 110, 115 for deduplication. As such, the document 100 includes a copy of each image 105, 110, 115, which increases the storage size (e.g., file size) of the document 100.

FIG. 5 shows the document 100' after a similar-image deduplication process has been applied in accordance with aspects of the invention. In embodiments, the similar-image deduplication engine 80 (as described in FIG. 1) identifies images 105, 110, and 115 as similar images, and replaces images 110 and 115 with image 105 in the document 100'. In this manner, the document 100' includes a single image (e.g., image 105) rather than three different images (e.g., images 105, 110, 115). In embodiments, the replacing may include replacing images 110 and 115 with duplicate copies of image 105 within the document 100'. In other embodiments, the replacing may include replacing images 110 and 115 with soft links pointing to the image 105. The document 100' may thus be saved with a single instance of the image 105 and with two reference pointers (e.g., soft links) that point to the single instance of the image 105 (e.g., the reference pointers being for the second and third occurrences of the image 105 in the document 100'). Reference pointers require less storage size than images (e.g., images 110 and 115) such that document 100' has a smaller storage size (e.g., file size) than document 100.

Figure 6:
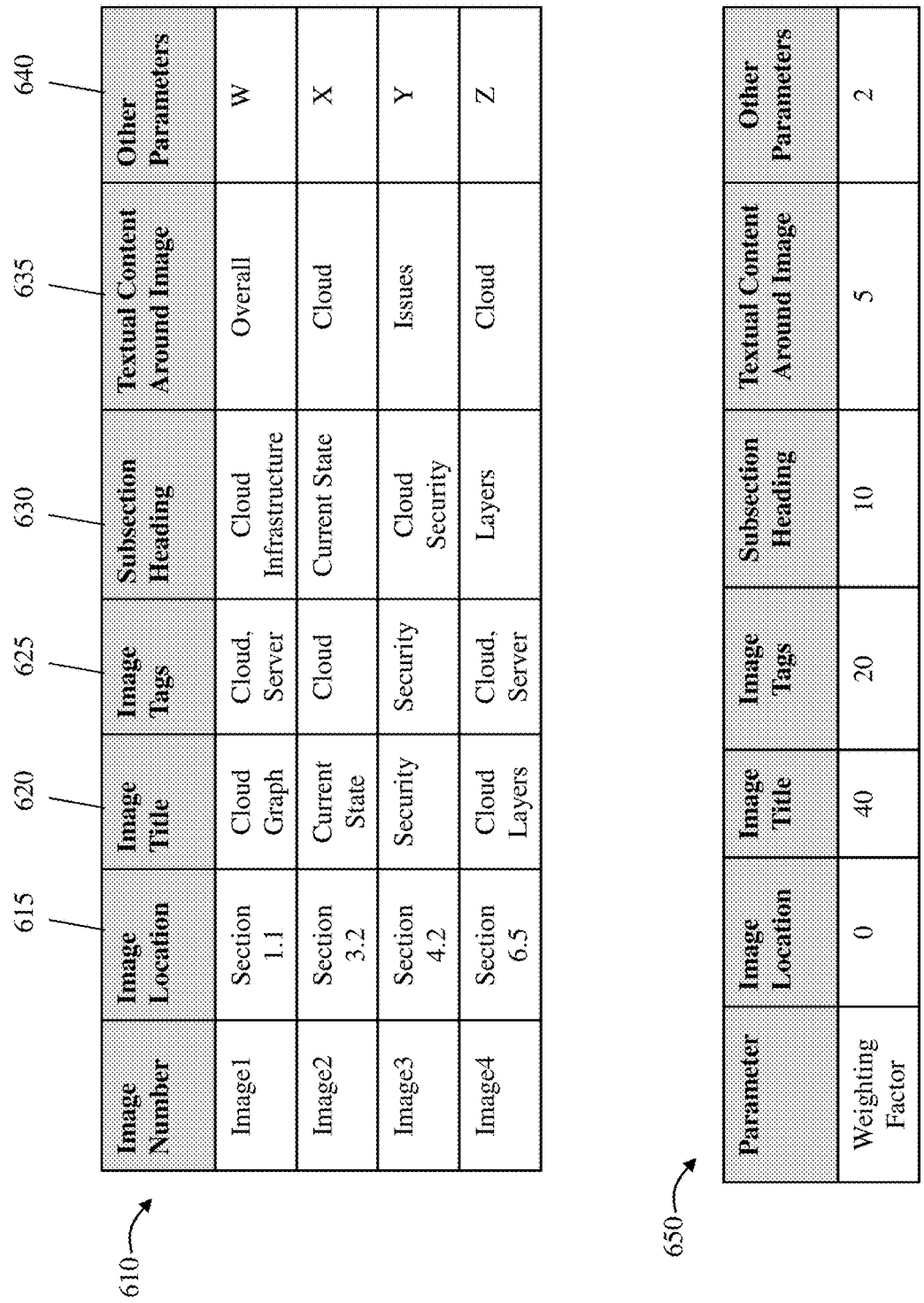
FIG. 6 shows exemplary data structures used in determining similar images in a document in accordance with aspects of the invention.

FIG. 6 shows exemplary data structures used in determining similar images in a document in accordance with aspects of the invention. Table 610 is an image information table containing information associated with various images in a document. For example, a document that is undergoing a similar-image deduplication process may contain four different images (e.g., in a manner similar to document 100 with images 105, 110, 115 described above). In embodiments, the engine 80 scans the document to collect information about the images and populates the table 610 with the information. The information may include, but is not limited to the following parameters: image location 615 in the document (e.g., by section number, etc.); image title 620 (e.g., file name); image tags 625 (e.g., metadata such as tags and/or keywords associated with an image); subsection heading 630 (e.g., heading of a subsection of the document in which the image is located); textual content around the image 635 (e.g., text of the document in a vicinity of the image); and any other suitable parameters 640.

For example, upon scanning the document, the engine 80 may identify four different images and assign the images the names Image1, Image2, Image3, and Image4, as depicted in the first column of table 610. The scanning may further reveal that Image1 is located in "Section 1.1" of the document, is titled "Cloud Graph", has the tags "Cloud" and "server", has a subsection heading "Cloud Infrastructure" in the document, and has textual content including the word "overall" around the image. Table 610 includes similar information for Image2, Image3, and Image 4.

Any suitable parameters may be used within the scope of the invention, and the invention is not limited to the particular parameters shown in table 610. Other parameters, e.g., the last column of table 610, may include, for example: geographic and/or cultural considerations since an image for a given concept may vary between different geographies and/or cultures; social network ratings data associated with an image (e.g., social network games and/or applications typically permit users to rate images for a particular concept); and corporate policy ratings data associated with an image during a particular time frame (e.g., some images may be more preferred than others during a particular time frame due to corporate policy). Such other parameters may enable the engine 80 to optimize the storage space for the document.

Still referring to FIG. 6, table 650 is a parameter weighting factor table containing a weighting factor (e.g., a numerical value) associated with each parameter of the image information table containing, e.g., table 610. For example, table 650 includes a weighting factor of "0" for the parameter "Image Location", a weighting factor of "40" for the parameter "Image Title", a weighting factor of "20" for the parameter "Image Tags", and so on. The weighting factors contained in table 650 may be defined by a user via I/O interface 22 described with respect to FIG. 1.

The invention is not limited to the parameters shown in table 610 or the weighting factor values shown table 650; rather, it is to be understood that any suitable parameters and/or weighting factor values may be used within the scope of the invention. Also, the invention is not limited to use with four images; instead, it is to be understood that a document may have any number of images that are scanned during a similar-image deduplication process in accordance with aspects of the invention.

Figure 7:
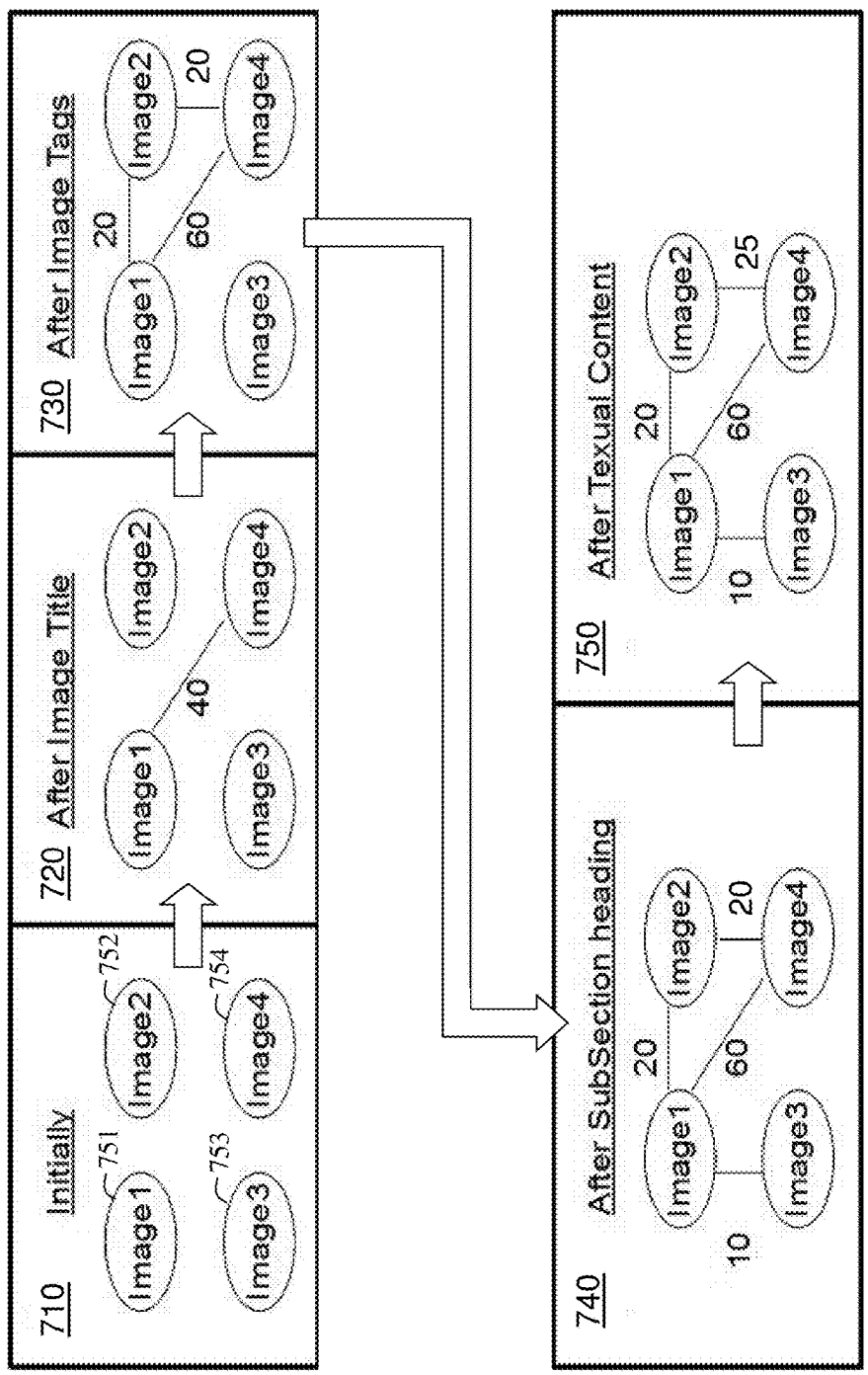
FIG. 7 depicts exemplary undirected weight graphs depicting relationships between images in accordance with aspects of the invention.

FIG. 7 depicts exemplary undirected weighted graphs 710, 720, 730, 740, 750 depicting relationships between Image1, Image2, Image3, and Image4 in accordance with aspects of the invention. In embodiments, the engine 80 creates the graphs 710, 720, 730, 740, 750 based on the data contained in tables 610 and 650. The images from table 610 (e.g., Image1, Image2, Image3, Image4) are depicted by nodes 751, 752, 753, 754. A line connecting two nodes is referred to as an edge and represents a relationship between the nodes, and the numeric value on the edge is a relative measure (e.g., a weight) of the relationship between the two nodes determined based on the data contained in tables 610 and 650. Since the nodes correspond to the images in the document, the weights of the edges represent relative measures of the similarity of the images. In this manner, the weights of the edges are used in embodiments in determining which images qualify as similar images for deduplication, and in selecting a master image from a group of similar images.

In particular, the respective graphs 710, 720, 730, 740, 750 show the cumulative weighting of edges between the four nodes 751, 752, 753, 754 after successive application of each respective parameter and weighting factor of tables 610 and 650. For example, graph 710 depicts the four nodes 751, 752, 753, 754 corresponding to the four images prior to applying any of the parameters and weighting factors and, thus, shows an initially empty graph that includes the four images but shows no relationship between the images. The absence of an edge connecting two nodes is equivalent to an edge having a weight of zero connecting the nodes.

Graph 720 depicts the calculated relationships between the four nodes after applying the "Image Title" parameter, but before applying the other parameters. For example, analyzing table 610 reveals that Image1 and Image 4 have matching data in the "Image Title" parameter, e.g., both Image1 and Image 4 have the term "cloud" in this column of table 610. Accordingly, the edge between Image1 and Image4 is incremented by the weighting factoring factor associated with this parameter (e.g., Image Title) as shown in Table 650, e.g., 40 points. Image1 and Image2 do not have a match for this parameter according to table 610, nor do Image2 and Image3, or Image3 and Image4. As such, graph 720 includes an edge connecting Image1 and Image4 with a weight of 40 and no edges between the other nodes.

Graph 730 depicts the calculated relationships between the four images after cumulatively applying the "Image Title" and "Image Tags" parameters, e.g., after applying the "Image Tags" parameter to the already-calculated values of graph 720. Image1 and Image2 have matching data in the "Image Tags" parameter in table 610, e.g., both Image1 and Image2 have the term "Cloud" in this column of table 610. Accordingly, the edge between Image1 and Image2 is incremented by the weighting factor associated with this parameter (e.g., Image Tags) as shown in Table 650, e.g., 20 points. Image2 and Image4 also have matching data in the "Image Tags" parameter in table 610 and, as such, the edge between Image2 and Image4 is incremented by the weighting factor associated with this parameter (e.g., Image Tags) as shown in Table 650, e.g., 20 points.

Still referring to graph 730, Image1 and Image4 also have matching data in the "Image Tags" parameter in table 610. Accordingly, the edge between Image2 and Image4 is also incremented by the weighting factor associated with this parameter (e.g., Image Tags) as shown in Table 650, e.g., 20 points. Since the edge between Image1 and Image4 already has a weight of 40 from graph 720, then the new weight of this edge in graph 730 equals the previous weight (40) plus the incremented weight (20) for a cumulative edge weight of 60 between Image1 and Image 4.

Image1 and Image3 do not have matching data in the "Image Tags" parameter in table 610. Nor do Image2 and Image3. As such, the edge weights between these respective images are not incremented in graph 730.

Still referring to FIG. 7, graph 740 depicts the calculated relationships between the four images after cumulatively applying the "Image Title", "Image Tags", and "Subsection Headings" parameters, e.g., after applying the "Subsection Headings" parameter to the already-calculated values of graph 730. Image1 and Image3 are the only images that have matching data for this parameter in table 610. Accordingly, the edge between Image1 and Image3 is incremented by the weighting factor associated with this parameter (e.g., Subsection Headings) as shown in Table 650, e.g., 10 points.

Graph 750 depicts the calculated relationships between the four images after cumulatively applying all the parameters, e.g., after applying the "Textual Content Around Image" parameter to the already-calculated values of graph 740. Image2 and Image4 are the only images that have a match for this parameter in table 610. Accordingly, the edge between Image2 and Image4 is incremented by the weighting factor associated with this parameter (e.g., Subsection Headings) as shown in Table 650, e.g., 5 points. Since the edge between Image2 and Image4 has a weight of 20 prior to applying the "Textual Content Around Image" parameter, the new weight of this edge is 5+20=25.

The process of constructing a weight graph accounting for all of the parameters (e.g., graph 750) is summarized as follows. First, create a graph having a node for each image listed in table 610 and initially set the weight of each edge of the graph to zero. Second, for a particular parameter in table 610, identify each node pair having matching data for this particular parameter. Third, for each respective node pair having matching data for this particular parameter, increment the weight of the edge between the respective node pair by the weighting factor for this particular parameter as defined in table 620. Repeat the second and third steps for each parameter in table 610.

According to aspects of the invention, the respective weights of the edges in the final weighted graph (e.g., graph 750) provide a relative measure of the similarity of the images in the document. The edge weight between two images is proportional to the likelihood that the images are similar. Stated differently, a higher edge weight represents a higher likelihood that the images connected by the edge have a similar intent (e.g., are similar images).

In embodiments, a threshold value is used in conjunction with the calculated edge weights of FIG. 7 to determine which ones of the images are sufficiently similar for deduplication. The threshold value may be defined by a user via I/O interface 22 as described in FIG. 1. The threshold value is used to identify a group (or subgraph) of similar images of graph 750 by including in the group only those images that are connected by edges having a weight greater than or equal to the threshold value.

Figure 8:
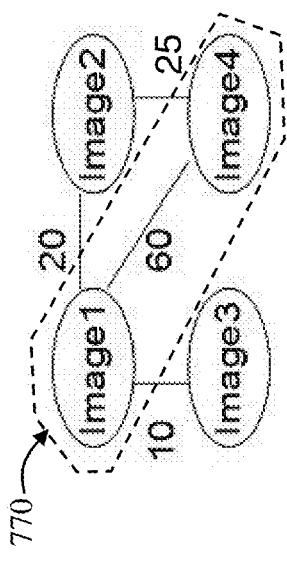
FIGS. 8 and 9 illustrate groups of similar images determined using an undirected weight graph and a threshold value in accordance with aspects of the invention.

FIG. 8 shows a group 770 (e.g., subgraph) of similar images based on graph 750 using an exemplary threshold value of 50. The group 770 includes Image1 and Image4 since these images are the only images of graph 750 connected by an edge having a weight (e.g., 60) greater than the threshold value (e.g., 50). As such, Image1 and Image4 are determined to be similar images eligible for deduplication within the document.

Figure 9:
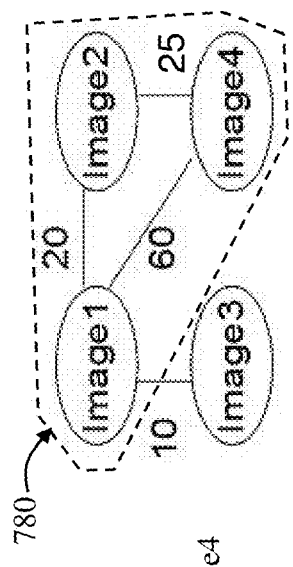

FIG. 9 shows a different group 780 (e.g., subgraph) of similar images based on graph 750 using a different exemplary threshold value of 20. The group 780 includes Image1, Image2, and Image4 since these images are connected by edges having respective weights greater than or equal to the threshold value. As such, Image1, Image2, and Image4 are determined to be similar images eligible for deduplication within the document.

Although single groups are shown in FIGS. 8 and 9, implementations of the invention may identify plural different groups of similar images in a single document. For example, the engine 80 may be programmed with an image group algorithm as follows. First, the weighted graph (e.g., graph 750) is created and variable "n" is set to a value of one. Second, create an empty group called group-n, and identify the edge having the highest weight in the graph. If the weight of this edge is less than the threshold value, then skip to the seventh step. Third, the two nodes connected by this highest weight edge are added to group-n. Fourth, identify all edges with a weight greater than or equal to the threshold value and connected to only one node in group-n. Fifth, delete edges of group-n from the graph. Sixth, increment the value of "n" by one and return to the second step to create another group. Seventh, end the group creation algorithm. This algorithm will output a list of "n" groups with each group containing similar images.

In embodiments, the engine 80 presents the determined similar images to the user, e.g., via display 24 as described in FIG. 1, and permits the user to designate one of the images as the master copy, e.g., via external device 14 as described in FIG. 1. For example, the engine 80 may present the user with a display similar to FIGS. 8 and 9, or some other format that indicates a grouping of similar images. The user may employ an interface (e.g., a graphic user interface) and external device to manually select the master copy from the images in the displayed group.

In addition to selecting a master copy from the group of images, the user may also restructure the group of similar images, e.g., by removing one or more images from the group and/or by adding one or more images to the group. For example, the presentation of the group to the user may be performed via an interface that permits the user to manually add or remove images from the group. Using the example of FIG. 9, the user may use a mouse or other external device to add Image3 to the group and/or remove Image2 from the group.

Upon receipt of a designation of the master copy and any optional group restructuring from the user, the engine 80 retains the designated master copy in the document, and replaces each of the other images in the group with either a duplicate copy of the master copy or a soft link (e.g., reference pointer) in the document that point to the master copy. Any image that was removed from the group by the user is not replaced with a soft link and, instead, is maintained in the document. In this manner, implementations of the invention provide deduplication of similar images in a document.

Alternatively, the engine 80 may be programmed to automatically select one of the determined similar images as the master copy without any input from the user. In embodiments, the automatic selection may be based on a node weight for each image in the group (e.g., subgraph). In embodiments, the node weight is the sum of weights of all edges of the group connected to a particular node. The node with the highest node weight is automatically designated as the master copy. Using the example in FIG. 9, node 751 has a node weight of 20+60=80, node 752 has a node weight of 20+25=45, and node 754 has a node weight of 60+25=85. Accordingly, the engine 80 automatically designates node 754 (e.g., Image4) as the master copy of the group of similar images (e.g., Image1, Image2, and Image4) since it has the highest node weight.

When two or more images in a group of similar images have the same highest node weight, a tiebreaker parameter may be used to automatically designate one of the two or more images as the master copy of the group. For example, the image having the smallest storage size (e.g., file size) may be designated as the master copy in such situations. Upon automatic designation of the master copy, the engine 80 retains the designated master copy in the document, and replaces each of the other similar images in the document with one of (i) a duplicate copy of the master copy and (ii) a soft link (e.g., reference pointer) to the master copy.

Flow Diagrams

FIG. 10 shows an exemplary flow for performing aspects of the present invention. The steps of FIG. 10 may be implemented in any of the environments of FIGS. 1-3, for example.

The flowcharts and block diagrams in the Figure illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figure. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Furthermore, the invention can take the form of a computer program product accessible from a computer-usable or computer-readable medium providing program code for use by or in connection with a computer or any instruction execution system. The software and/or computer program product can be implemented in the environment of FIGS. 1-3. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

FIG. 10 depicts an exemplary flow for a similar-image deduplication process in accordance with aspects of the present invention. At step 910, a deduplication system (e.g., a computing device running the similar-image deduplication engine 80) receives input from the user (e.g., local computing device), the input comprising a request to deduplicate similar images in a document. The request may include an identification of the document, which may comprise, for example, a collaborative writing document that has been edited by plural users. The request may be initiated through an application used to edit the document, e.g., as part of a menu in a word processing program for editing the document. Step 910 additionally includes the deduplication system obtaining a copy of, or access to, the document.

At step 915, the deduplication engine scans the document for images and creates a list of images contained in the document. At step 920, the deduplication engine collects and tabulates information about the images detected at step 915. In embodiments, steps 915 and 920 are collectively used to create an image information table (e.g., table 610 of FIG. 6) in a similar manner as described with respect to FIG. 6.

At step 925, the deduplication engine accesses a parameter weighting factor table, such as table 650 described with respect to FIG. 6. The parameter weighting factor table may be predefined and stored in memory (e.g., memory 28 of FIG. 1), and accessed by the deduplication engine at step 925. Alternatively, the deduplication engine may prompt the user to enter values for the weighting factors at step 925 and receive such values via a user interface, e.g., I/O interface 22 described with respect to FIG. 1.

At step 930, the deduplication engine generates a weighted graph including the images identified at step 915 and using the data obtained at steps 920 and 925. The weighted graph of step 930 may be generated in a manner similar to graph 750 described with respect to FIG. 7.

At step 935, the deduplication engine creates one or more groups of similar images based on the weighted graph of step 930 and a threshold value, e.g., in a manner similar to that described with respect to FIGS. 8 and 9. The threshold value may be predefined and stored in memory (e.g., memory 28 of FIG. 1), and accessed by the deduplication engine at step 935. Alternatively, the deduplication engine may prompt the user to enter a threshold value at step 935 and receive the threshold value via a user interface, e.g., I/O interface 22 described with respect to FIG. 1.

At step 940, the deduplication engine determines whether the user wishes to restructure a particular group of similar images as determined at step 935. For example, the deduplication engine may present the user with a visual indication of the similar images in the group, and permit the user to provide feedback including adding one or more images to the group and/or removing one or more images from the group. When the user provides feedback to restructure the particular group, then at step 945 the deduplication engine restructures the group accordingly, e.g., removes and/or adds one or more images to the particular group.

At step 950, the deduplication engine determines whether the user wishes to designate the master copy of the particular group, e.g., by providing the user with a prompt via the user interface. When the user provides feedback to select the master copy, then at step 955 the deduplication engine designates the user-selected image as the master copy of the particular group. On the other hand, when the user does not select the master copy, then at step 960 the deduplication engine automatically designates an image as the master copy of the particular group, e.g., using nodes weights as described with respect to FIG. 9 or some other suitable automatic selection logic.

At step 965, the deduplication engine replaces remaining images in the particular group, other than the master copy designated at step 955 or step 960, with either a duplicate of the master copy or a soft link (e.g., reference pointer) to the master copy. This may be performed in a manner similar to that described with respect to FIG. 5. For example, step 965 may comprise modifying the electronic document by replacing each remaining image of the group, other than the master copy, with one of (i) a duplicate copy of the master copy and (ii) a soft link in the document pointing to the master copy, and saving the modified document.

At step 970, the deduplication engine determines if there are any remaining groups from step 935 that have not yet been deduplicated. If there is at least one remaining groups, then the process returns to step 940 for handling the next group. Otherwise, the process ends.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology and provides or utilizes services. In return, the service provider can receive payment from the customer(s) under a subscription and/or fee agreement and/or the service provider can receive payment from the sale of advertising content to one or more third parties.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A method of deduplicating images in a single document, the method comprising:
    identifying, by a computer processor, a plurality of similar images in the single document, wherein the identifying includes:
        populating a table with weighting factors for each of a plurality of parameters associated with a plurality of images, the parameters including image title and image tags, such that the table includes weighting factors for the image title and the image tags for each of a plurality of images;
        generating weighted graphs based on the weighting factors, wherein the plurality of images are depicted as nodes in the weighted graph and a cumulative edge weight between nodes is generated by the cumulative application of the weighting factors for each of the plurality of parameters, wherein at least one of the cumulative edge weights between nodes is greater than zero; and
        using the cumulative edge weight between nodes to determine the plurality of similar images;
    presenting, by the computer processor, the plurality of similar images with the respective cumulative edge weights to a user via a graphical user interface;
    designating, by the computer processor, the one of the plurality of similar images as a master copy based on a received user selection of the one of the plurality of similar images as the master copy; and
    replacing, by the computer processor, each remaining one of the plurality of similar images, other than the master copy, with one of (i) a duplicate copy of the master copy and (ii) a soft link pointing to the master copy,
    wherein the single document is an electronic document of a word processor application.

2. The method of claim 1, wherein the plurality of parameters further include: image location; subsection heading; textual content around image; geographic and/or cultural considerations; social network ratings; and corporate policy ratings data during a particular time frame.

3. The method of claim 1, wherein, for each weighted graph, the step of generating weighted graphs comprises:
    creating an initial graph including the nodes and setting the weight of each edge of the initial graph to zero, wherein the weight of each edge is the weight between respective nodes;
    identifying each node pair having matching data for a particular one of the plurality of parameters; and
    incrementing a weight of an edge between the respective node pairs by the weighting factor for the particular one of the plurality of parameters for each respective node pair having matching data for the particular parameter, and wherein:
    the nodes of the weighted graph correspond to all the images in the electronic document; and the weight of an edge between the respective nodes represents a measure of similarity of the nodes.

4. The method of claim 3, wherein the identifying the plurality of similar images comprises comparing the weight of an edge between the respective nodes to a threshold value.

5. The method of claim 1, further comprising receiving user feedback to restructure the plurality of similar images.

6. The method of claim 5, further comprising adding another image to the plurality of similar images based on the user feedback.

7. The method of claim 5, further comprising removing an image from the plurality of similar images based on the user feedback.

8. The method of claim 1, further comprising performing the identifying, the designating, and the replacing as part of a similar-image deduplication process in a cloud environment.

9. The method of claim 1, wherein the electronic document comprises a collaborative writing document.

10. The method of claim 1, wherein a service provider at least one of creates, maintains, deploys and supports the computer infrastructure.

11. The method of claim 1, wherein steps of claim 1 are provided by the service provider on a subscription, advertising, and/or fee basis.

12. A computer program product comprising a computer readable hardware storage device having program instructions stored on the computer readable hardware storage device, the program instructions including:
   program instructions to scan a document to collect data associated with a plurality of images in the document;
   program instructions to arrange the data according to a plurality of parameters, including populating a table with the plurality of weighting factors, wherein the plurality of parameters include image title and image tags;
   program instructions to obtain a plurality of weighting factors corresponding to the plurality of parameters, respectively;
   program instructions to determine a group of similar images from the plurality of images based on the data and the plurality of weighting factors, including:
      generating weighted graphs based on the weighting factors, wherein the plurality of images are depicted as nodes in the weighted graph and a weight between nodes is generated by the cumulative application of the weighting factors for each of the image title and image tags; and
      using weights of edges of the nodes to determine the group of similar images;
   program instructions to present the group of similar images with respective assigned weights to a user via a graphical user interface;
   program instructions to designate the one image of the group as a master copy based on a received user selection of the one image as the master copy;
   program instructions to modify the document by replacing each remaining image of the group, other than the master copy, with one of (i) a duplicate copy of the master copy and (ii) a soft link in the document pointing to the master copy; and
   program instructions to save the modified document.

13. The computer program product of claim 12, further comprising program instructions to present the group of similar images to a user via an interface that is configured to: permit the user to restructure the group by adding a different image to the group and/or removing an existing image from the group.

14. A computer system for image deduplication of a single document, the system comprising:
   one or more computer processors;
   a computer readable hardware storage device;
   program instructions stored on the computer readable hardware storage device for execution by the one or more computer processors, the program instructions comprising:
      program instructions to scan the single document to collect data associated with a plurality of images in the single document;
      program instructions to arrange the data according to a plurality of weighted parameters, the data including weighting factors of a numerical value associated with a subsection heading and a numerical value associated with textual content around each image;
      program instructions to generate a weighted graph based on the weighted parameters, including the parameters of the subsection heading and the textual content around each image, wherein the plurality of images are depicted as nodes in the weighted graph;
      program instructions to calculate cumulative edge weights for each of the plurality of weighted parameters of the weighted graph to determine a group of similar images from the plurality of images in the single document;
   program instructions to present the group of similar images with the respective cumulative edge weights to a user via a graphical user interface;
   program instructions to designate the one image of the group as a master copy based on a received user selection of the one image as the master copy; and
   program instructions to modify the single document by replacing each remaining image of the group, other than the master copy, with a duplicate copy of the master copy.

15. The computer program product of claim 12, wherein:
   the plurality of parameters further include: image location; subsection heading; and textual content around image;
   the plurality of weighting factors include: a numerical value associated with the image location; a numerical value associated with the image title; a numerical value associated with the image tags; a numerical value associated with the subsection heading; and a fifth numerical value associated with the textual content around image; and
   the cumulative edge weights of the weighted graph are weights between respective node pairs in the weighted graph.

16. The system of claim 14, wherein program instructions to generate a weighted graph include, for each graph, instructions to:
   create an initial graph including the nodes and setting the weight of each edge of the initial graph to zero;
   identify each node pair having matching data for a particular one of the plurality of weighted parameters; and
   increment a weight of the edge between the respective node pairs by the weighting factor for the particular one of the plurality of weighted parameters for each respective node pair having matching data for the particular parameter, and wherein the program instructions further include:

program instructions to compare the edge weights of the weighted graph to a predetermined threshold value in order to determine the group of similar images from the plurality of images in the single document, wherein edge weights having a value greater than or equal to the threshold value indicate that the associated node pairs are similar images.

* * * * *